US012633649B2

(12) United States Patent

Valente et al.

(10) Patent No.: US 12,633,649 B2

(45) Date of Patent: May 19, 2026

(54) HINGE INCLUDING ANTENNA

(71) Applicant: GOOGLE LLC, Mountain View, CA (US)

(72) Inventors: Matthew Thomas Valente, Sunnyvale, CA (US); Srivatsan Ravindran, San Jose, CA (US); Sajeev Alakkatt Paleri, Santa Clara, CA (US)

(73) Assignee: GOOGLE LLC, Mountain View, CA (US)

(*) Notice: Subject to any disclaimer, the term of this patent is extended or adjusted under 35 U.S.C. 154(b) by 148 days.

(21) Appl. No.: 18/461,949

(22) Filed: Sep. 6, 2023

(65) Prior Publication Data

US 2025/0079692 A1    Mar. 6, 2025

(51) Int. Cl.
| | |
|---|---|
| *H01Q 1/27* | (2006.01) |
| *G06F 1/16* | (2006.01) |
| *H01Q 21/00* | (2006.01) |

(52) U.S. Cl.
CPC ............. *H01Q 1/273* (2013.01); *G06F 1/163* (2013.01); *G06F 1/1681* (2013.01); *G06F 1/1698* (2013.01); *H01Q 21/00* (2013.01)

(58) Field of Classification Search
CPC ........ H01Q 1/273; H01Q 21/00; G06F 1/163; G06F 1/1681; G06F 1/1698
See application file for complete search history.

(56) References Cited

U.S. PATENT DOCUMENTS

| | | | | |
|---|---|---|---|---|
| 2019/0033622 A1* | 1/2019 | Olgun | .................... | H04B 1/385 |
| 2019/0237856 A1 | 8/2019 | Rautio | | |
| 2021/0149224 A1* | 5/2021 | Zhang | .................... | G02C 11/10 |
| 2023/0213771 A1* | 7/2023 | Choe | ..................... | H01Q 1/273 |
| | | | | 345/8 |

FOREIGN PATENT DOCUMENTS

CA    3029729 A1 *  6/2019   ............... G02C 5/14

OTHER PUBLICATIONS

Wang, et al., "A Glasses Frame Antenna for the Applications in Internet of Things", IEEE Internet of Things Journal, vol. 6, Iss. 5 (https://ieeexplore.ieee.org/document/8743464), Oct. 2019, pp. 8911-8918.

* cited by examiner

*Primary Examiner* — Jimmy T Vu
(74) *Attorney, Agent, or Firm* — Brake Hughes Bellermann LLP

(57)    ABSTRACT

A hinge for a computing device includes at least one antenna extending from a body portion of the hinge into a body portion of the computing device. When incorporated into a head mounted wearable device, the hinge couples an arm portion to a front frame portion of the device, with the at least one antenna extending into an installation area defined by the front frame portion. The at least one antenna does not occupy installation space in the arm portions, providing additional space for other electrical components of the device, and provides for modularity in coupling a variety of arm portions housing different arrangements and/or combinations of electrical components to a variety of different front frames.

18 Claims, 12 Drawing Sheets

Initiate assembly
410

Select front frame portion
420

Select arm portions
430

Couple selected arm portions to selected front frame portion via hinges
440

Assembly Complete

HINGE INCLUDING ANTENNA

FIELD

This relates, generally, to an antenna for a computing device, and in particular, to an antenna embedded in a hinge of a computing device.

BACKGROUND

Computing devices typically include components that rely on at least one antenna for communication with other devices, communication with network resources, and the like. In some computing devices, volume for accommodating the at least one antenna, in addition to other electronic components, interface ports, interface devices and the like, may be somewhat constrained due to, for example, form factor, accessibility considerations, aesthetic considerations, and the like. Additionally, the integration and placement of an antenna, particularly into a wearable computing device, may also take into consideration such as, for example, proximity to the body when worn.

SUMMARY

A computing device, in accordance with implementations described herein, includes at least one antenna incorporated into a hinge of the computing device.

In some aspects, the techniques described herein relate to a head mounted wearable device, including: a frame, including: a front frame portion, the front frame portion including: at least one hinge coupled in a shoulder portion of the front frame portion; and at least one antenna extending from the at least one hinge into the front frame portion of the frame; and at least one arm portion rotatably coupled to the front frame portion by the at least one hinge; and a plurality of electronic components received in an installation volume defined in the at least one arm portion.

In some aspects, the techniques described herein relate to a head mounted wearable device, wherein a body portion of the at least one hinge is coupled in a shoulder portion of the front frame portion of the frame, and wherein the at least one antenna includes: a first antenna extending from the body portion of the at least one hinge along an upper orbital portion of the front frame portion; and a second antenna extending from the body portion of the at least one hinge along a lower orbital portion of the front frame portion. In some aspects, the techniques described herein relate to a head mounted wearable device, wherein the first antenna and the second antenna are electrically isolated from each other, and separately are operable.

In some aspects, the techniques described herein relate to a head mounted wearable device, wherein the at least one antenna is coupled to or integrally formed with a body portion of the at least one hinge, and extends from the body portion of the at least one hinge into an installation volume defined in the front frame portion of the frame.

In some aspects, the techniques described herein relate to a head mounted wearable device, wherein the at least one antenna is coupled to or integrally formed with a body portion of the at least one hinge, and is embedded in a material forming the front frame portion of the frame.

In some aspects, the techniques described herein relate to a head mounted wearable device, wherein the at least one arm portion includes a first arm portion and a second arm portion; the at least one hinge includes: a first hinge having a body portion thereof fixed in a first shoulder portion of the front frame portion and a coupling portion that rotatably couples the first arm portion to the front frame portion; and a second hinge having a body portion thereof fixed in a second shoulder portion of the front frame portion and a coupling portion that rotatably couples the second arm portion to the front frame portion; and the at least one antenna includes a plurality of antennas extending from the first hinge and the second hinge into the front frame portion of the frame.

In some aspects, the techniques described herein relate to a head mounted wearable device, wherein at least one of the plurality of antennas is configured to communicate with an external device.

In some aspects, the techniques described herein relate to a head mounted wearable device, wherein at least one of the plurality of antennas is configured to communicate with another of the plurality of antennas.

In some aspects, the techniques described herein relate to a head mounted wearable device, wherein the plurality of antennas includes: a first antenna extending from the body portion of the first hinge along a first lower portion of the front frame portion; a second antenna extending from the body portion of the second hinge along a second lower portion of the front frame portion; a third antenna extending from the body portion of the first hinge along a first upper portion of the front frame portion; and a fourth antenna extending from the body portion of the second hinge along a second upper portion of the front frame portion.

In some aspects, the techniques described herein relate to a head mounted wearable device, wherein the at least one hinge includes: a body portion coupled in a shoulder portion of the front frame portion of the frame, wherein the at least one antenna extends from the body portion into the front frame portion of the frame; a coupling portion extending outward from the body portion and configured to be coupled to a coupling portion of the at least one arm portion; at least one fastener configured to rotatably engage the coupling portion of the at least one arm portion and the coupling portion of the at least one hinge.

In some aspects, the techniques described herein relate to a hinge for a head mounted wearable device, the hinge including: a body portion coupled in a shoulder portion of a front frame portion of a frame of the head mounted wearable device; at least one antenna extending from the body portion into the front frame portion of the frame; a coupling portion extending outward from the body portion and configured to be coupled to a coupling portion of an arm portion of the head mounted wearable device; and at least one fastener configured to rotatably engage the coupling portion of the arm portion and the coupling portion of the hinge.

In some aspects, the techniques described herein relate to a hinge, wherein the at least one antenna includes: a first antenna extending from the body portion and into the front frame portion along an upper orbital portion of the front frame portion; and a second antenna extending from the body portion and into the front frame portion along a lower orbital portion of the front frame portion.

In some aspects, the techniques described herein relate to a hinge, wherein the first antenna and the second antenna are electrically isolated from each other, and are separately operable.

In some aspects, the techniques described herein relate to a hinge, wherein at least one of the first antenna or the second antenna is configured to communicate with an external device.

In some aspects, the techniques described herein relate to a hinge, wherein at least one of the first antenna or the second antenna is configured to communicate with an antenna of another hinge of the head mounted wearable device.

In some aspects, the techniques described herein relate to a hinge, wherein the at least one antenna is coupled to or integrally formed with the body portion, and the at least one antenna extends from the body portion of the hinge into an installation volume defined in the front frame portion, or is embedded in a material forming the front frame portion of the frame.

In some aspects, the techniques described herein relate to a method of assembling a head mounted wearable device, including: selecting a front frame portion, the front frame portion including: a first hinge coupled in a first shoulder portion of the front frame portion; a second hinge coupled in a second shoulder portion of the front frame portion; and at least one antenna extending into the front frame portion from at least one of the first hinge or the second hinge; and selecting a first arm portion including a first plurality of electronic components; selecting a second arm portion including a second plurality of electronic components; coupling the first arm portion to the front frame portion via the first hinge; and coupling the second arm portion to the front frame portion via the second hinge.

In some aspects, the techniques described herein relate to a method, wherein selecting the front frame portion includes selecting the front frame portion from a plurality of front frame portions, the front frame portion having the first hinge, the second hinge, and the at least one antenna previously incorporated.

In some aspects, the techniques described herein relate to a method, wherein the at least one antenna includes a plurality of antennas, the plurality of antennas including: a first antenna extending from the first hinge into the front frame portion, along a first lower portion of the front frame portion; a second antenna extending from the second hinge into the front frame portion, along a second lower portion of the front frame portion; a third antenna extending from the first hinge into the front frame portion, along a first upper portion of the front frame portion; and a fourth antenna extending from the second hinge into the front frame portion, along a second upper portion of the front frame portion.

In some aspects, the techniques described herein relate to a method, wherein at least one of the plurality of antennas is configured to communicate with an external device, and at least one of the plurality of antennas is configured to communicate with another of the plurality of antennas The details of one or more implementations are set forth in the accompanying drawings and the description below. Other features will be apparent from the description and drawings, and from the claims.

BRIEF DESCRIPTION OF THE DRAWINGS

FIGS. 3D-3F are close in views of an example hinge portion of the example computing device shown in FIGS. 2A-2C, including a first antenna and a second antenna.

DETAILED DESCRIPTION

In some computing devices, the incorporation of one or more antennas can be constrained by, for example, form factor, available installation volume, placement for optimal signal transmission, placement of other components in the computing device, and the like. In the case of a wearable computing device, the incorporation of one or more antennas into the wearable computing device can be further constrained by, for example, proximity to the body, both for effectiveness of the antenna(s) and for safety considerations, wearability considerations, aesthetic considerations, and the like. For example, the form factor and installation considerations associated with a computing device in the form of a head mounted wearable device, or smart glasses, may pose challenges in accommodating the incorporation of the antenna(s), in addition to all of the other components of the smart glasses, in and/or on the installation volume defined by the frame and/or at portions of the frame that allow for effective operation of the antenna(s). The desire to further refine form factor may further complicate the incorporation of the antenna(s) into a computing device in the form of a head mounted wearable device, or smart glasses.

A hinge for a computing device, in accordance with implementations described herein, includes an antenna that extends from a body portion of the hinge into a body portion of the computing device. In some examples, the antenna is coupled to the body portion of the hinge. In some examples, the antenna is integrally formed with the body portion of the hinge. In some examples, the antenna can be tuned to a desired frequency based on a shape and/or a size and/or other configuration factors. In some examples, the hinge incorporates an antenna into an existing form factor associated with the computing device that is not otherwise allocated to the installation of electronic components of the computing device. A hinge including an antenna, in accordance with implementations described herein, maintains a modularity of the elements of the computing device that are coupled by the hinge, allowing the elements to be selectively removed and replaced. A hinge, in accordance with implementations described herein, incorporated into a computing device, can thus provide for the installation or one or more antenna(s) without a significant impact on the overall form factor of the computing device.

Figure 1:
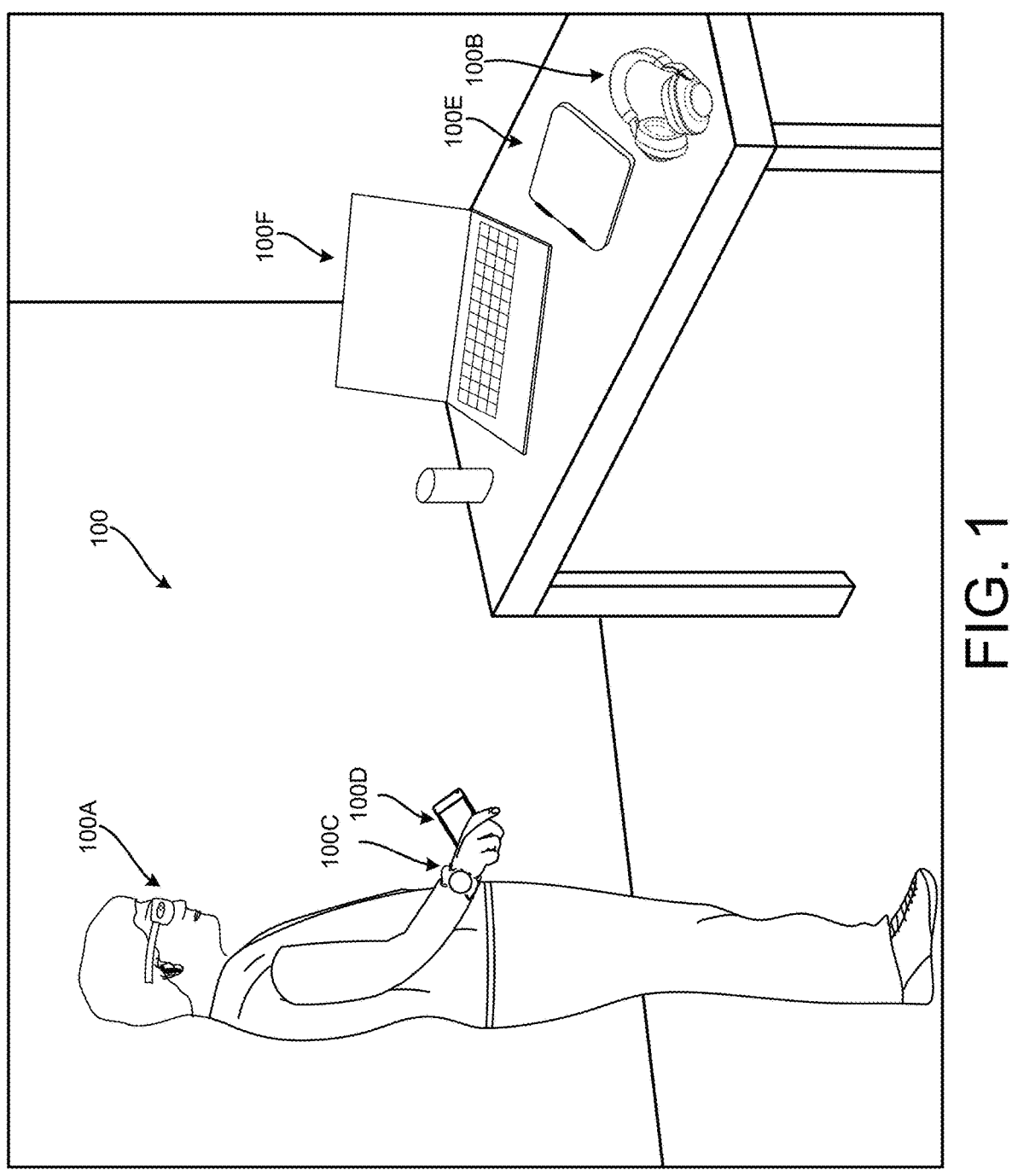
FIG. 1 illustrates example computing devices.

FIG. 1 illustrates some example computing devices 100, into which a hinge including an antenna, in accordance with implementations described herein, can be incorporated. Some of the example computing devices 100 shown in FIG. 1 are wearable computing devices. For example, FIG. 1 illustrates a first example computing device 100A, in the form of a head mounted computing device such as, for example, goggles or smart glasses, worn by a user. FIG. 1 illustrates a second example computing device 100B in the form of a head and/or ear mounted computing device, such as, for example, headphones. FIG. 1 illustrates a third example computing device 100C in the form of a wrist worn computing device, such as, for example, a smart band or smart watch, worn by the user. FIG. 1 illustrates a fourth example computing device 100D in the form of a handheld computing device, for example, a foldable computing device. FIG. 1 illustrates a fifth example computing device 100E in the form of a tablet computing device, for example a foldable tablet computing device. FIG. 1 illustrates a sixth example computing device 100F in the form of a laptop computing device. FIG. 1 illustrates just some example computing devices 100 into which a hinge including an antenna, in accordance with implementations described herein, can be incorporated. The principles described herein can be applied to other computing devices including at least one hinge coupling elements of the computing device.

In some situations, installation space, or volume, available to accommodate functional components, including one or more antennas, may be constrained due to, for example, the form factor associated with a particular computing device, the number and/or arrangement of internal components driven by functionality associated with the form factor, user accessibility to features associated with the components, aesthetics, and other such factors. This may be further complicated in a wearable computing device, in which factors such as proximity of the antenna to the body, weight and weight distribution of components within the device, and the like, are taken into consideration.

A computing device in the form of a head mounted wearable device, in accordance with implementations described herein, includes one or more antennas that extend from a hinge portion into a front frame portion of a frame of the head mounted wearable device. Locating the one or more antennas in the front frame portion of the frame may distance or separate the one or more antennas from the body of the user, such that the one or more antennas are spaced apart from the head of the user in the as-worn configuration of the head mounted wearable device. The antenna, extending from the body portion of the hinge and into the front frame portion of the frame, may support a modular configuration and construction of the head mounted wearable device. That is, this may allow for the removal/replacement, and/or for the customization, of different temple arm portions, including different components and/or arrangements of components received therein, with different front frame portions. In some examples, an installation volume occupied by the antenna does not detract from an installation volume available to accommodate other electronic components of the head mounted wearable device, thus providing flexibility in the number and/or arrangement of electronic components in the head mounted wearable device.

Figure 2A:
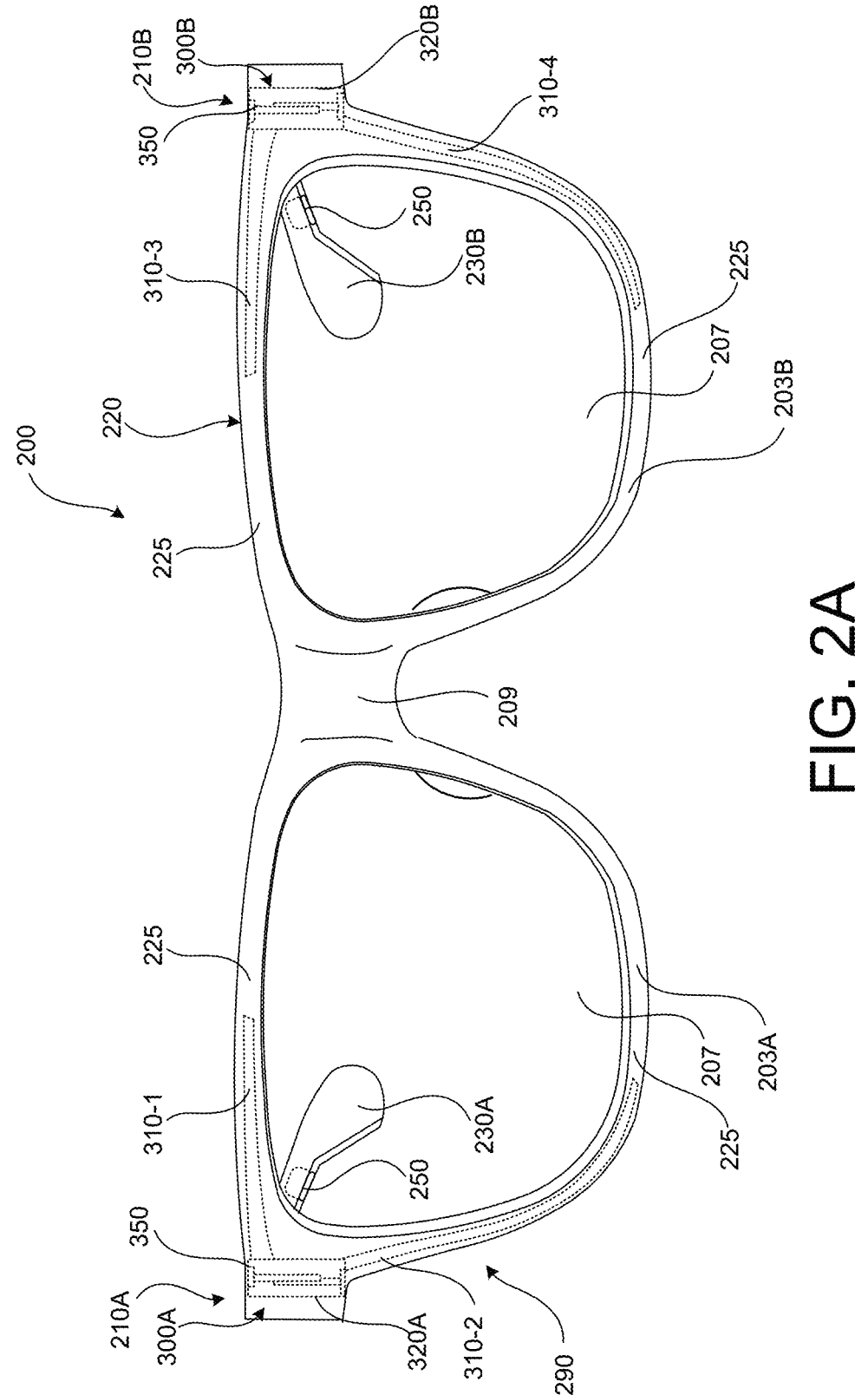
FIG. 2A is a front view of an example computing device.
Figure 2B:
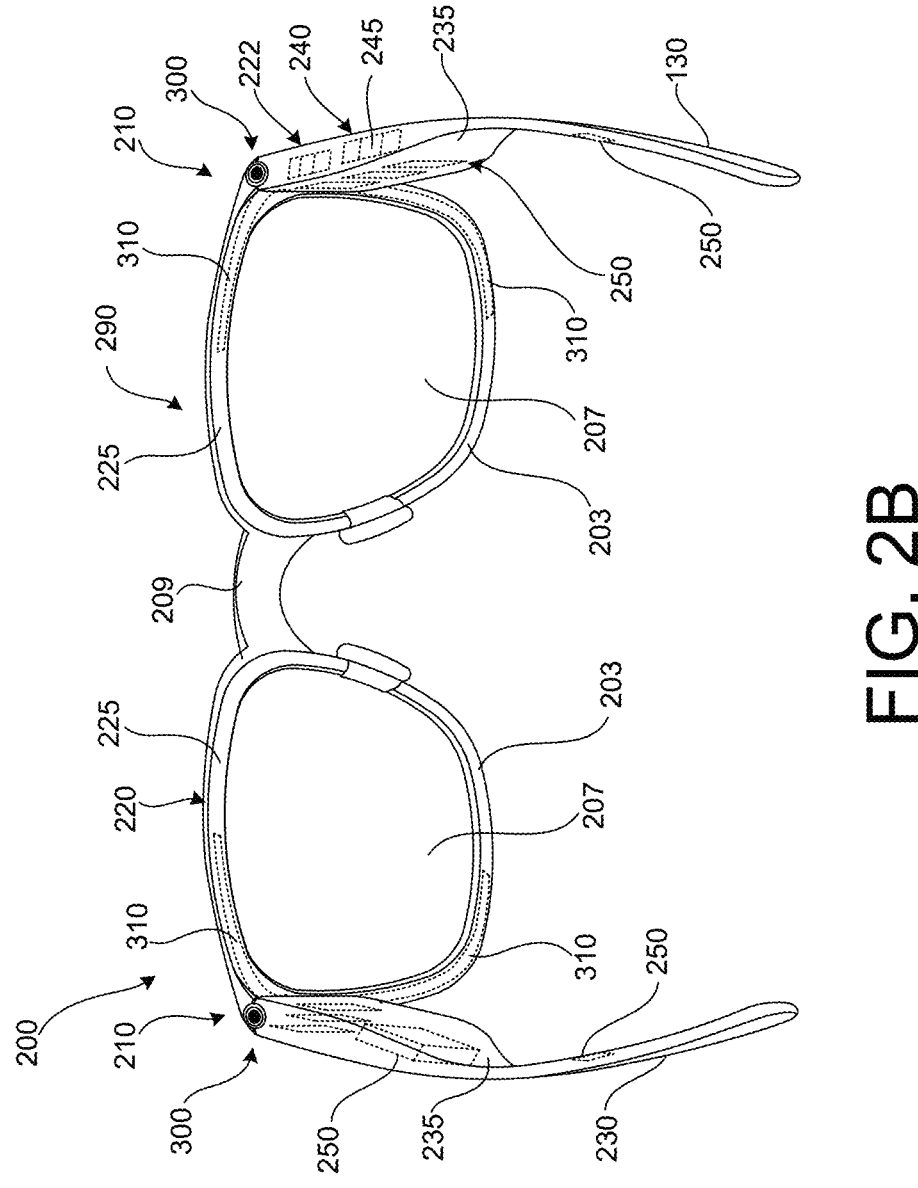
FIG. 2B is a rear view of the example computing device shown in FIG. 2A.
Figure 2C:
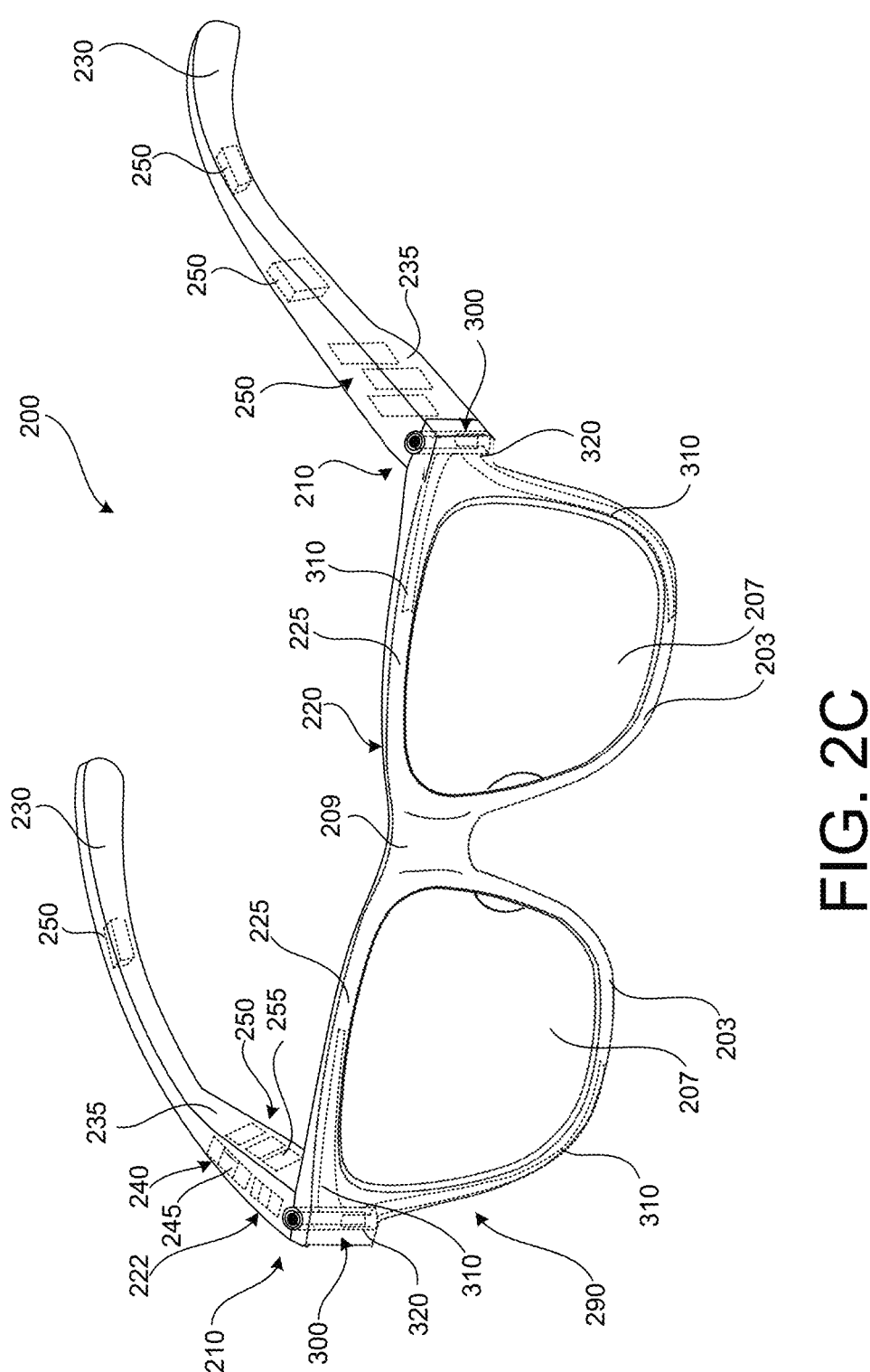
FIG. 2C is a perspective view of the example computing device shown in FIGS. 2A and 2B.
Figure 2D:
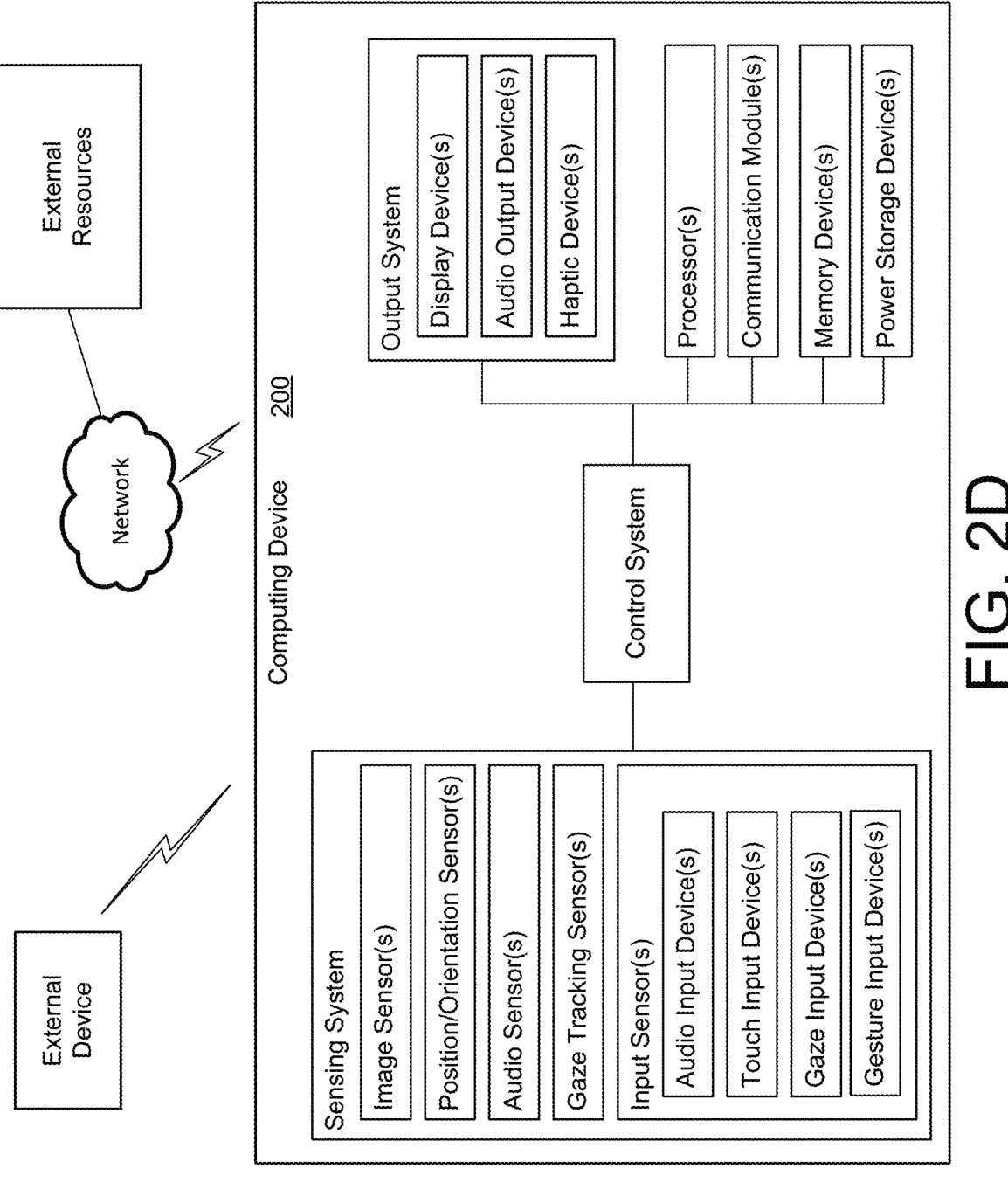
FIG. 2D is a block diagram of the example computing device shown in FIGS. 2A-2C.

FIGS. 2A-2C illustrate features of an example computing device 200, in the form of an example head mounted wearable device into which a hinge including at least one antenna, in accordance with implementations described herein, can be incorporated. In particular, FIG. 2A is a front view, FIG. 2B is a rear view, and FIG. 2C is a perspective view of the example computing device 200, in the form of the head mounted wearable device. FIG. 2D is a block diagram of the example computing device 200 shown in FIGS. 2A-2C. The features of the example computing device 200 to be described with respect to FIGS. 2A-2D are presented for purposes of discussion and illustration. The principles to be described herein can be applied to a computing device including more, or fewer features and/or different combinations of features than described herein, arranged similarly to or differently from the example arrangements shown herein.

In some examples, a form factor associated with a computing device poses challenges in accommodating all of the components within the installation volume defined by a structure, or housing, or enclosure, or frame of the computing device 100. For example, the form factor and associated installation volume of the example computing device 200 in the form of the example head mounted wearable device, or smart glasses, may pose challenges in accommodating all of the components of the computing device 200 in and/or on the installation volume defined by a frame of the example computing device 200. In some situations, this is further complicated by the need for placement of components in or on specific portions of the example computing device 200 for effective operation of the components, case of user access to features associated with the components, wearability, and other such factors. In the computing device 200 in the form of the example head mounted wearable device, or smart glasses, shown in FIGS. 2A-2C, functionality, available space, distribution of weight, user comfort, and the like, may drive placement of components in and/or on the frame of the computing device. A hinge including at least one antenna, in accordance with implementations described herein, incorporated into the example computing device 200, allows the at least one antenna to make use of installation in a portion of the frame that is spaced apart from, or distanced from the body of the user, to facilitate operation of the antenna, and to provide for safe operation of the antenna while the computing device 200 is worn by the user. The at least one antenna occupies installation space not occupied by other components of the computing device 200, making installation space (that would otherwise have been occupied by the at least one antenna) available for the installation of other components of the computing device 200. In some examples, this allows for the installation of larger and/or additional components in the installation space previously occupied by the at least one antenna, and/or improved operation of existing components in the installation space. In some examples, the installation space in which the at least one antenna is received allows for installation of a larger antenna and/or the incorporation of additional antennas, thus improving the communication capabilities and enhancing the functionality of the computing device 200.

Hereinafter, a hinge including at least one antenna, in accordance with implementations described herein, will be described with respect to incorporation into a computing device in the form of a head mounted wearable device, or smart glasses, simply for purposes of discussion and illustration. The principles to be described herein are applicable to incorporation of the hinge into other computing devices, including the example computing devices shown in FIG. 1, and other computing devices not explicitly described herein.

The computing device 200, in the form of the example head mounted wearable device, includes a frame 290. The frame 290 includes arm portions 230 coupled to a front frame portion 220 at respective hinge portions 210. In some examples, portions of the frame 290 define a housing in which components of the computing device 200 are received. In some examples, hollow interior portions of the frame 290 define the housing in which components of the computing device 200 are received. In some examples, components of the computing device 200 housed in the frame 290 are embedded in a material of a corresponding portion of the frame 290. In the example shown in FIGS. 2A-2C, the front frame portion 220 includes rim portions 203 surrounding glass portions, or lenses 207, with a bridge portion 209 extending between the rim portions 203. In some examples, the lenses 207 may be corrective/prescription lenses. In some examples, the lenses 207 may be glass portions that do not necessarily incorporate corrective/prescription parameters. The frame 290, including the front frame portion 220 and the arm portions 230, define a housing in which components of the example computing device 200 can be coupled in, or on.

The computing device 200 shown in FIGS. 2A-2C includes hinges 300 that couple each arm portion 230 to the front frame portion 220 of the frame 290. In particular, in the example shown in FIGS. 2A-2C, a first of two hinges 300 is installed at a first of the two hinge portions 210 to couple a first of the two arm portions 230 to a first end portion of the front frame portion 220 of the frame 290, and a second of the two hinges 300 is installed at a second of the two hinge portions 210 to couple a second of the two arm portions 230 to a second end portion of the front frame portion 220 of the frame 290. At least one of the two hinges 300 includes an antenna 310 extending from a body portion of the hinge 300 into the front frame portion 220 of the frame 290. In some examples, the antenna 310 is integrally formed with the body portion 320 of the hinge 300. In some examples, the antenna 310 is otherwise coupled to the body portion 320, so as to extend from the body portion 320 into the front frame portion 220 of the frame 290. The antenna 310 provides for communication with other, external devices, communication with external resources via a network, and the like. In some examples, the antenna(s) 310 may be tuned to operate in a desired frequency range. For example, a size and/or a shape and/or an orientation and/or other configuration consider-ations may cause the antenna(s) to radiate the radio output at a desired frequency, or within a desired frequency range. The example shown in FIGS. 2A-2C illustrates multiple different examples of antennas 310 extending from a body portion 320 of each hinge 300 into the front frame portion 220 of the frame 290. In this manner, the antennas 310 are received within an installation volume 225 defined within the front frame portion 220 of the frame 290, leaving an installation volume 235 defined within the arm portions 230 available for the installation of a plurality of electronic components 250 of the computing device 200.

In particular, in the example shown in FIG. 2A, a first hinge 300A couples a first arm portion 230A to the front frame portion 220 at a first hinge portion 210A of the frame 290. A second hinge 300B couples a second arm portion 230B to the front frame portion 220 at a second hinge portion 210B of the frame 290. A first example antenna 310-1 extends from a body portion 320A of the first hinge 300A, into an upper orbital portion of the front frame portion 220 corresponding to a first rim portion 203A of the frame 290. A second example antenna 310-2 extends from the body portion 320A of the first hinge 300A, into a lower orbital portion of the front frame portion 220 corresponding to the first rim portion 203A of the frame 290. A third example antenna 310-3 extends from a body portion 320B of the second hinge 300B, into an upper orbital portion of the front frame portion 220 corresponding to a second rim portion 203B of the frame 290. A fourth example antenna 310-4 extends from the body portion 320B of the second hinge 300B, into a lower orbital portion of the front frame portion 220 corresponding to the second rim portion 203B of the frame 290. The example antennas 310-1, 310-2, 310-3 and 310-4 are provided for discussion and illustration of the concepts described herein. The example computing device 200 can include one, or some, or all of the example antennas 310-1, 310-2, 310-3 and 310-4 shown in FIG. 2A.

The example computing device 200, in the form of the head mounted wearable device, or smart glasses, includes a plurality of different electronic components 250 that provide for various functionality of the computing device 200. The plurality of different electronic components 250 can include, for example, a display device, an audio input device (or microphone), an audio output device (or speaker), an image sensor (or camera), an illumination device, a gaze tracking device, a power storage device (or battery), and other such components. In the example shown in FIGS. 2A-2C, the plurality of electronic components 250 are collectively iden-tified, at a variety of different positions within the arm portions 230 of the computing device 200. The computing device 200 can include more, or fewer components, and/or different combinations of components, arranged similarly to or differently from the example arrangement shown in FIGS. 2A-2C.

In the example arrangement shown in FIGS. 2A-2C, the antennas 310 (for example, the antennas 310-1, 310-2, 310-3 and 310-4) are all positioned in the front frame portion 220 of the frame 290, rather than in one, or both, of the arm portion(s) 230 of the frame 290. Movement of the antenna(s) 310 into the front frame portion 220 may allow for a larger antenna 310 and/or multiple different antennas 310, to be incorporated into the computing device 200, thus improving the communication capabilities and enhancing the utility and functionality of the computing device 200. Movement of the antenna(s) 310 into the front frame portion 220 may make additional installation space available in one or both of the arm portions 230. The additional installation space in one or both of the arm portions 230 may be used to accommodate more, or different, electronic components 250, different arrangements of electronic components 250, and the like, thus enhancing functionality and utility of the computing device 200. The additional installation space in one or both of the arm portions 230 may allow for additional cooling space surrounding the existing electronic components 250, thus enhancing the operation of the existing electronic components 250. In some examples, most, or all, of the electronic components 250 are received in or on the arm portions 230, with the antenna(s) 310 received in the front frame portion 220. This physical arrangement may improve a distribution of weight in the computing device 200, balancing weight of the electronic components 250 between the two arm portions 230 (and removing weight from the front frame portion 220), thus improving user comfort in the as-worn state of the computing device 200.

In some examples, the plurality of electronic components 250 includes a plurality of sensing devices of a sensing system 222 of the computing device 200. The sensing system 222 can include, for example, one or more image sensors, one or more position and/or orientation sensors such as, for example, an inertial measurement unit (includ-ing, for example, a gyroscope, accelerometer, magnetometer and the like), gaze tracking sensors (tracking, for example, head gaze, eye gaze, and the like). Some of the plurality of sensing devices are configured to provide for the detection of user inputs including, for example, audio inputs, touch inputs, gaze inputs, gesture inputs, and the like. Some of the plurality of sensing devices are configured to provide for the output of information to the user, including, for example, audio content, visual content, haptic feedback, and the like.

In the example shown in FIGS. 2A-2D, the computing device 200 includes a display device 255 that outputs visual content, for example, augmented reality, or virtual reality, or mixed reality content, under the control of the control system 240. In the example shown in FIGS. 2A-2C, the display device 255 is provided in one of the two arm portions 230, simply for purposes of discussion and illus-tration. Display devices 255 can be provided in each of the two arm portions 130 to provide for binocular output of content.

in some examples, the plurality of electronic components 250 includes a plurality of control system devices of a control system 240 of the computing device 200. In some examples, the control system 240 includes at least one processor 245 that is operably coupled to the control system devices of the control system 240, for control of the plurality of electronic components 250 of the computing device 200. In some examples, the control system 240 is in communication with other components of the plurality of electronic components 250, including, for example, communication modules, memory/storage devices, and the like, to further provide for control of the operation of the computing device 200. In some examples, the computing device 200 under control of the control system 240 can communicate with other, external devices, via, for example, a wireless communication protocol, a wired connection, and the like. In some examples, the computing device 200 can communicate with a network via, for example, a wireless communication protocol or a wired connection, to access other external resources, devices, and the like.

In some examples, the at least one antenna 310 facilitates communication of the computing device 200 with external devices. For example, the at least one antenna may facilitate communication of the computing device 200, in the form of the head mounted wearable device, or smart glasses, with an external device such as the handheld computing device 100D, the wrist worn computing device 100C, and the like, shown in FIG. 1, to provide for the exchange of information. In some examples, this communication between the computing device 200 and such an external device can be carried out wirelessly, implementing an appropriate wireless communication protocol.

As noted above, one or both of the hinges 300 include at least one antenna 310 extending from the body portion 320 of the hinge 300 into the front frame portion 220 of the frame 290, provide for communication of the example computing device 200 with other external devices, with network resources, and the like. As the antenna(s) 310 extend into the front frame portion 220 of the frame 290, the antennas 310 do not occupy any of the installation volume 235 defined in the arm portions 230 of the frame 290. This leaves the installation volume 235 in the arm portions 230 available for housing the electronic components 250 as described above. This example arrangement provides for modularity of the frame 290, in that different arm portions 230, housing different electronic components 250 and/or arrangements and/or combinations thereof, can be selectively coupled to a selected one of a plurality of front frame portions 220. This modularity provides the consumer/user with numerous options for configuring and customizing the computing device 200. This modularity may also facilitate stock management by a supplier of the head mounted wearable devices, in that the supplier can quickly and easily provide a head mounted wearable device in response to a customer requested configuration, without maintaining an extensive stock of numerous different configurations of head mounted wearable devices.

Figure 3A:
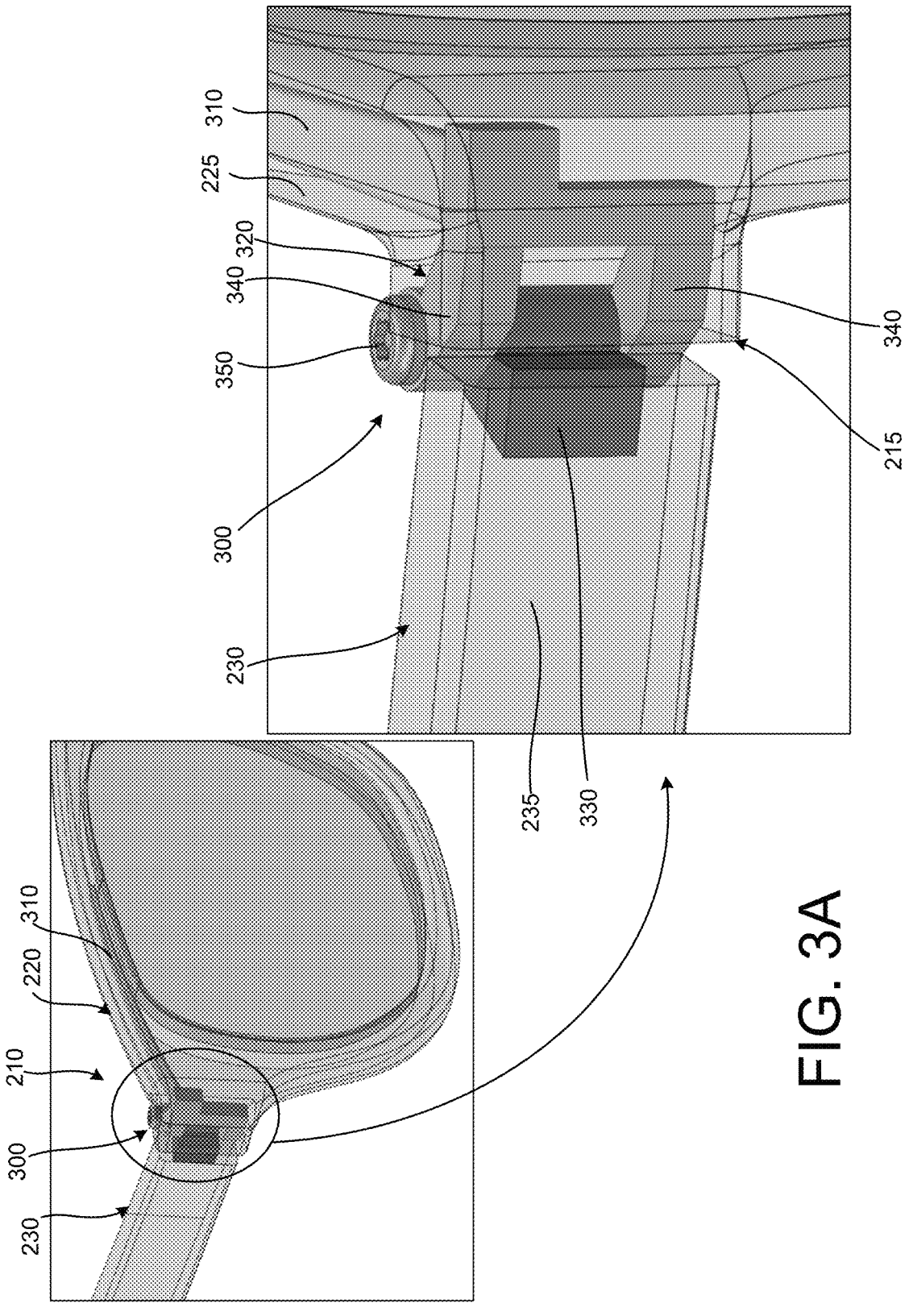
FIGS. 3A-3C are close in views of an example hinge portion of the example computing device shown in FIGS. 2A-2C, including a first antenna.
Figure 3B:
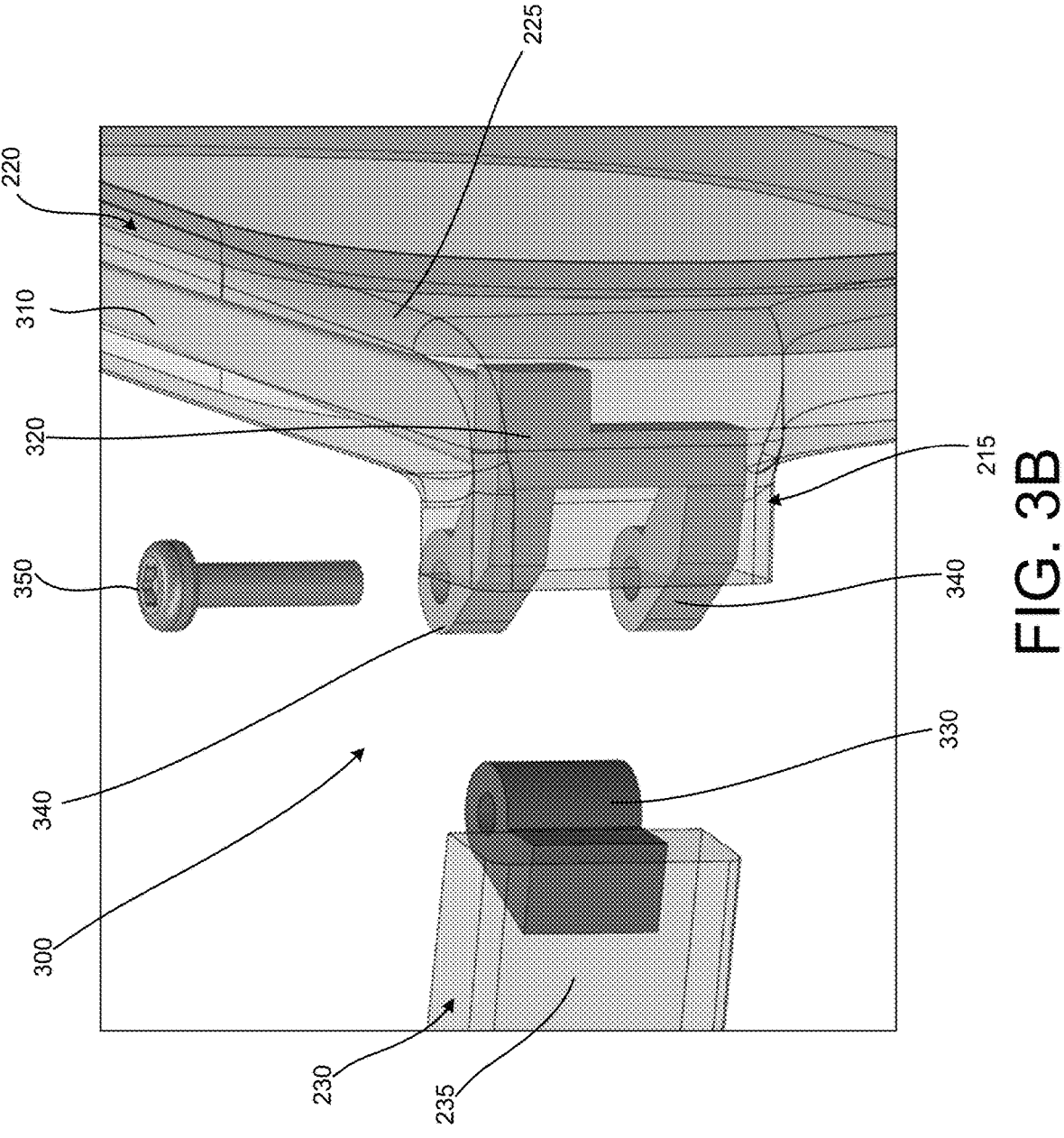
Figure 3C:
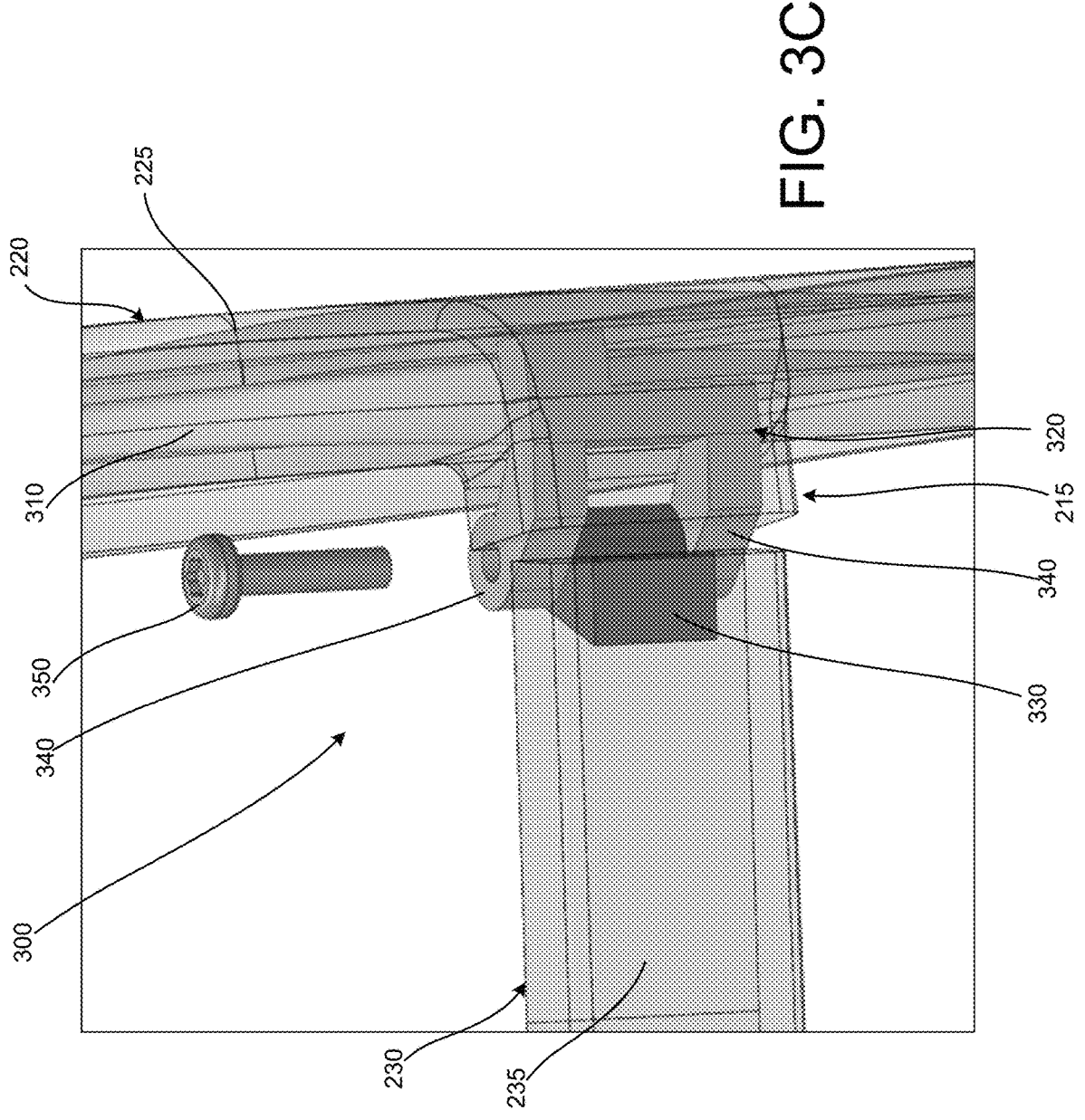

FIG. 3A is a close-in view of one of the hinge portions 210 of the example computing device 200, illustrating one of the example antennas 310 extending from the hinge portion 210 into the front frame portion 220 of the frame 290. FIG. 3B is an exploded disassembled view of the hinge portion 210 shown in FIG. 3A, with the arm portion 230 separated from the front frame portion 220, so that features of the hinge 300 are more easily visible. FIG. 3C is a partially assembled view of the hinge portion shown in FIGS. 3A and 3B. FIGS. 3A-3C illustrate the antenna 310 extending into the upper orbital portion of the front frame portion 220 of the frame 290, simply for purposes of discussion and illustration. The principles to be described are applicable to antennas 310 extending into other portions of the front frame portion 220, including, for example, the lower orbital portion of the front frame portion 220 of the frame 290, as in the example illustrated in FIGS. 2A-2C.

In the example shown in FIGS. 3A-3C, the body portion 320 of the hinge 300 is coupled in a shoulder portion 215 of the front frame portion 220 of the frame 290. In some examples, the body portion 320 is mechanically coupled in the shoulder portion 215. In some examples, the body portion 320 is embedded in the shoulder portion 215, for example, during fabrication of the front frame portion 220 of the frame 290. In some examples, the body portion 320 of the hinge 300 is otherwise fixed in, or coupled in the shoulder portion 215 of the front frame portion 220 of the frame 290. The antenna 310 extends outward from the body portion 320, into the installation volume 225 defined by the front frame portion 220. In FIGS. 3A-3CB, the antenna 310 extends into the upper orbital portion of the front frame portion 220. In some examples, the hinge 300 includes a coupling portion 340 that is selectively couplable to a corresponding coupling portion 330 provided on the arm portion 230. In some examples, the coupling portion 330 of the arm portion 230 is joined with the coupling portion 340 of the hinge 300 by a coupling device, or a fastener. Rotatable engagement of coupling portion 330 of the arm portion 230 and the coupling portion 340 of the hinge 300 by the coupling device, or fastener, provides for the rotatable coupling of the arm portion 230 to the front frame portion 220. In the example shown in FIGS. 3A-3C, the hinge 300 is in the form of a barrel hinge. In this example arrangement, the coupling portion 330 of the arm portion 230 is mated, or aligned with the coupling portion 340 of the hinge 300. Insertion of a pin 350 into the mated coupling portions 330, 340 of the arm portion 230 and the hinge 300 rotatably engages the coupling portions 330, 340, providing for rotation of the arm portion 230 relative to the front frame portion 220 about a rotational axis defined by the pin 350. In some examples, the joining of the coupling portion 330 of the arm portion 230 with the coupling portion 340 of the hinge 300 may establish an electrical connection for communication between the antenna 310 and the electronic components 250 received in the corresponding arm portion 230. These features of the example hinge 300 are provided for purposes of discussion and illustration. The principles described herein can be applied to other types of hinges that can include an antenna extending from a body portion of the hinge and into the installation volume 225 defined in the front frame portion 220 of the frame 290.

Figure 3D:
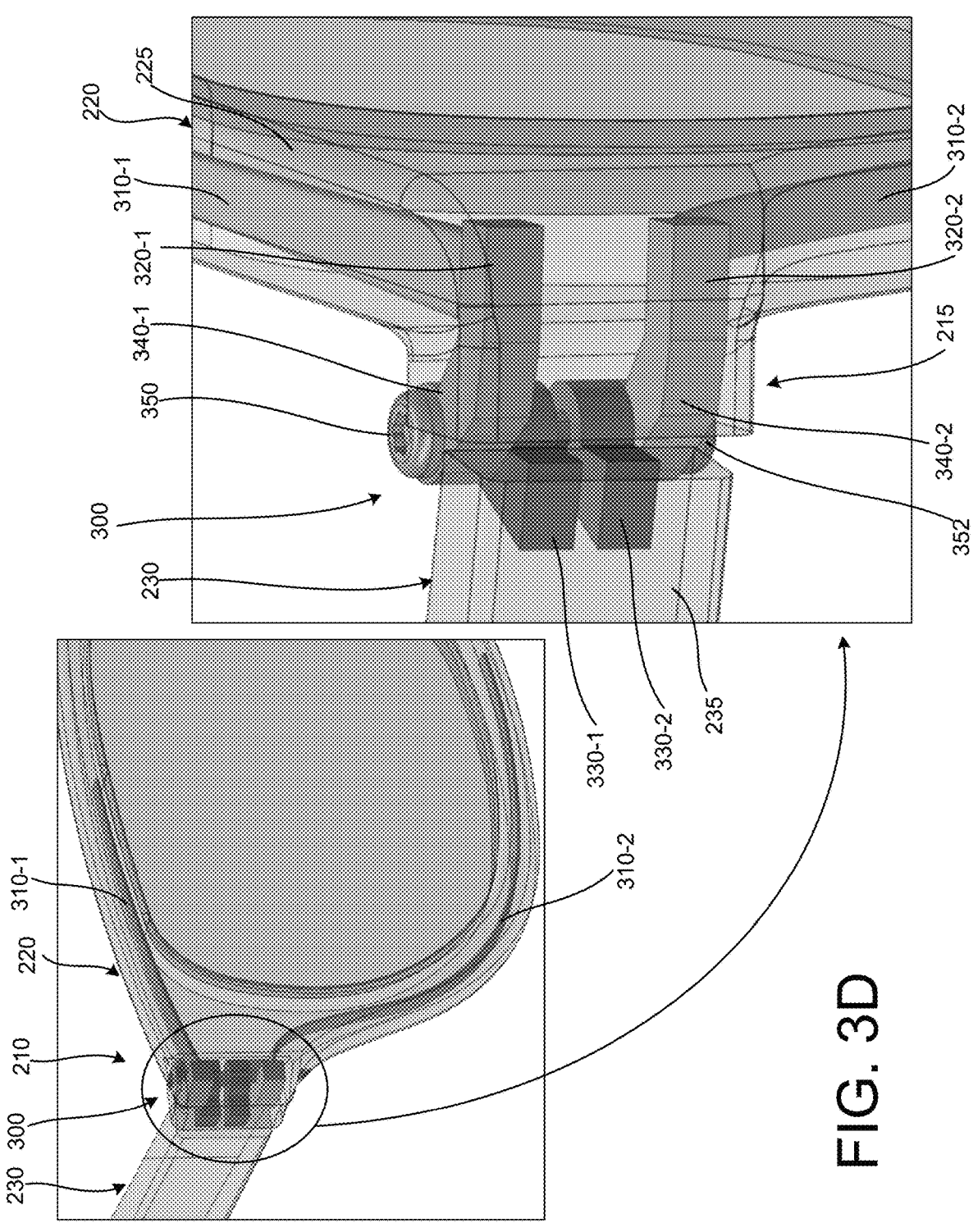
Figure 3E:
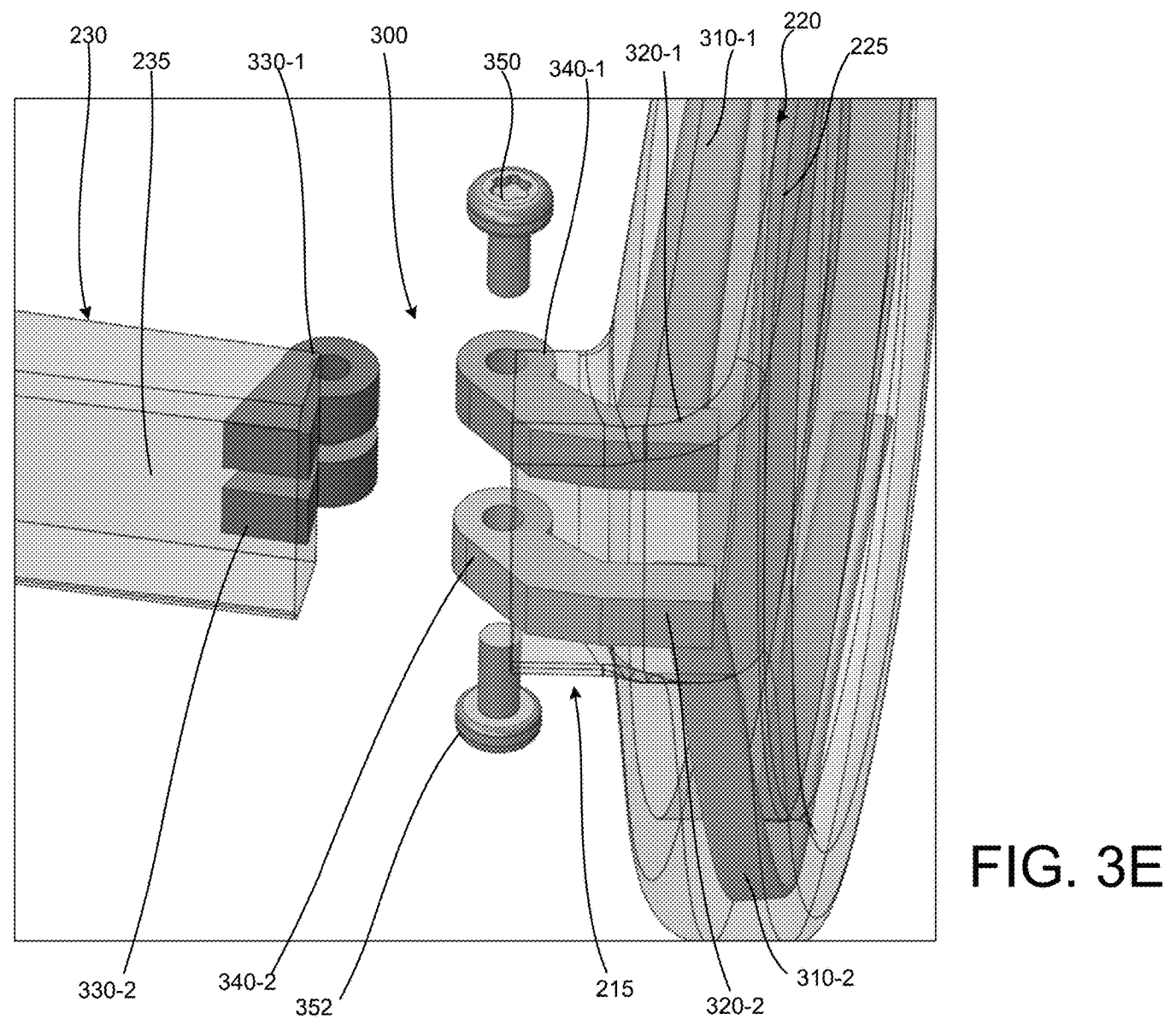
Figure 3F:
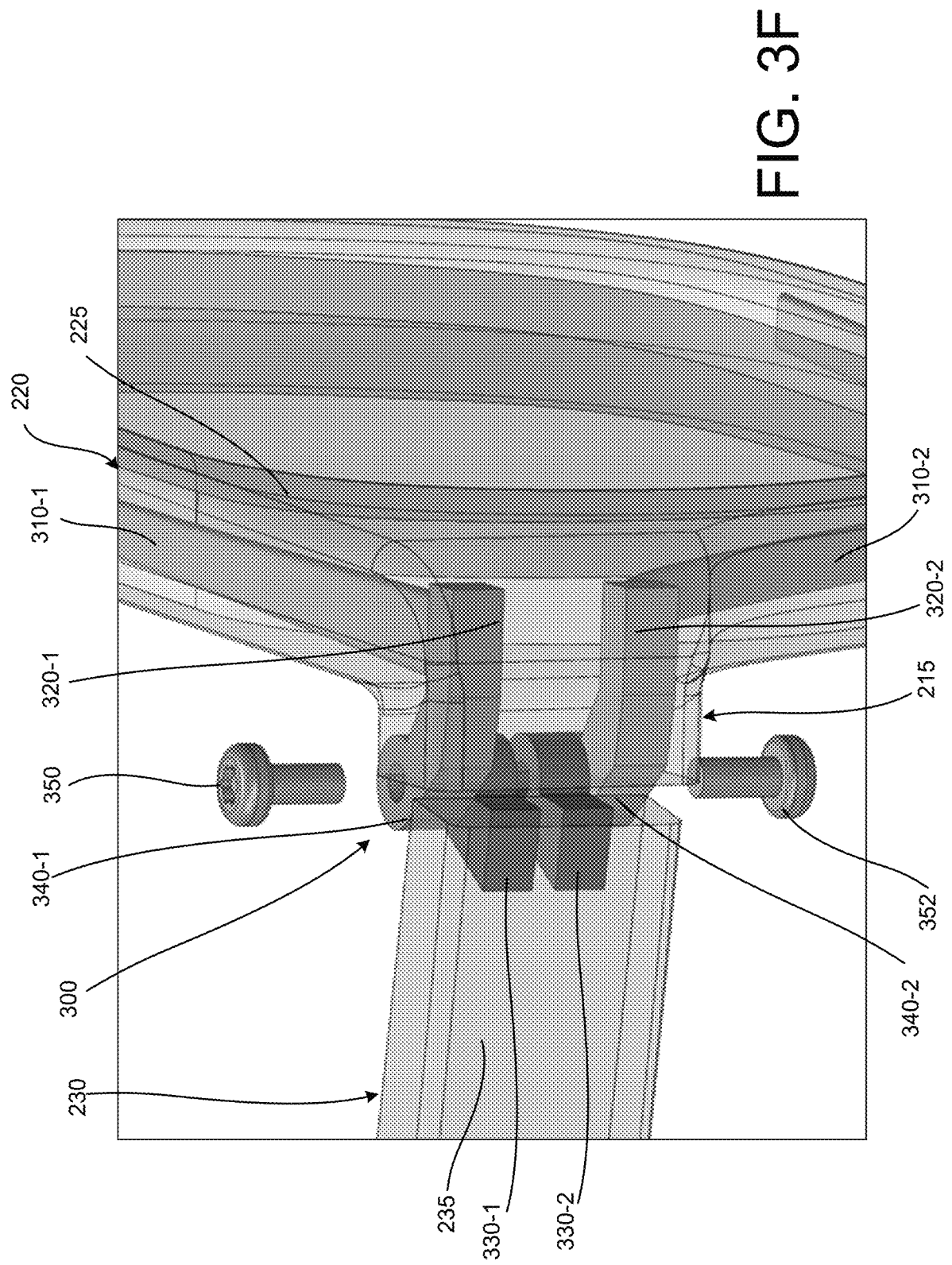

FIG. 3D is a close-in view of the hinge portion 210 described above, illustrating the hinge 300 including multiple antennas 310 extending from the body portion 320 of the hinge 300 into the installation volume 225 defined by the front frame portion 220 of the frame 290. In particular, FIG. 3D illustrates the first antenna 310-1 extending into a corresponding upper orbital portion of the front frame portion 220 of the frame 290, and the second antenna 310-2 extending into the corresponding lower orbital portion of the front frame portion 220 of the frame 290. FIG. 3E is an exploded disassembled view of the hinge portion 210 shown in FIG. 3D, with the arm portion 230 separated from the front frame portion 220, so that features of the hinge 300 are more easily visible. FIG. 3F is a partially assembled view of the hinge portion shown in FIGS. 3D and 3E. In some examples, the rotatable coupling of the arm portion 230 to the front frame portion 220 by the hinge 300 in FIGS. 3D-3F is similar to the coupling described above with respect to FIGS. 3A-3C. As shown in FIGS. 3D-3F, in some examples, a second pin 352, in addition to the first pin 350 described above, may be included in the coupling of the hinge 300 to the arm portion 230. In some examples, the first pin 350 extends partially into the hinge 300 to couple a first coupling portion 340-1 extending from the first antenna 310-1 via a first body portion 320-1 to a first coupling portion 330-1 in the arm portion 230, and the second pin extends partially into the hinge to couple a second coupling portion 340-2 extending from the second antenna 310-2 via a second body portion 320-2 to a second coupling portion 330-2 in the arm portion 230. In some examples, an arrangement of the first antenna 310-1 and the second antenna 310-2 relative to the body portion 320 of the hinge 300 may provide for electrical isolation of the first antenna 310-1 and the second antenna 310-2. In some examples, the joining of the respective coupling portions of the hinge 300 and the arm portion 230 in this manner establishes a connection that provides for the transmission of signals between the antennas 310-1, 310-2 and the electronic components 250 received in the corresponding arm portion 230.

In some examples, the computing device 200 is configured such that both the first hinge 300A and the second hinge 300B each include at least one antenna 310. In some examples, the at least one antenna 310 of the first hinge 300A and the at least one antenna 310 of the second hinge 300B communicate with each other. In this example, communication between the at least one at least one antenna 310 of the first hinge 300A and the at least one at least one antenna 310 of the second hinge 300B may provide for the exchange of information related to electronic components 250 received in the first arm portion 230A and electronic components 250 received in the second arm portion 230B of the frame 290. In some examples, both the at least one antenna 310 of the first hinge 300A and the at least one antenna 310 of the second hinge 300B communicate with the external device. In this example, the at least one antenna 310 of the first hinge 300A may provide for the exchange of information related to electronic components 250 received in the first arm portion 230A of the frame 290, and the at least one antenna 310 of the second hinge 300B may provide for the exchange of information related to electronic components 250 received in the second arm portion 230B of the frame 290.

In some examples, the first hinge 300A includes multiple antennas 310, such as, for example, the first antenna 310-1 and the second antenna 310-2 shown in FIGS. 2A-2C, and the second hinge 300B includes multiple antennas 310, such as, for example, the third antenna 310-3 and the fourth antenna 310-4 shown in FIGS. 2A-2C. In this example, one of the first antenna 310-1 or the second antenna 310-2 may communicate with the external device, and the other of the first antenna 310-1 or the second antenna 310-2 may communicate with one of the antennas 310 of the second hinge 300B. Similarly, one of the third antenna 310-3 or the fourth antenna 310-4 may communicate with the external device, and the other of the third antenna 310-3 or the fourth antenna 310-4 may communicate with one of the antennas 310 of the first hinge 300A. Thus, in some examples, the first antenna 310-1, the second antenna 310-2, the third antenna 310-3, and the fourth antenna 310-4 operate in coordination with each other. This example arrangement may provide for communication and exchange of information between the external device and the electronic components 250 housed in the first arm portion 230A, communication and exchange of information between the external device and the electronic components 250 housed in the second arm portion 230B, and communication and exchange of information between the electronic components 250 housed in the first arm portion 230A and the electronic components 250 housed in the second arm portion 230B. In examples involving the operation of a plurality of antennas 310, the plurality of antennas may be set to operate at different frequencies, to avoid interference.

In some examples, a number of antenna(s) 310 included with the first hinge 300A is the same as a number of antenna(s) 310 included with the second hinge 300B. In some examples, a number of antenna(s) 310 included with the first hinge 300A is different from a number of antenna(s) 310 included with the second hinge 300B. In some examples, an arrangement of antenna(s) 310 included with the first hinge 300A is the same as, or mirrors, or is symmetrical with, an arrangement of antenna(s) 310 included with the second hinge 300B. In some examples, a physical configuration, for example, a size and/or a shape and/or a contour of antenna(s) 310 included with the first hinge 300A is the same as, or mirrors, or is symmetrical with, a physical configuration, i.e., a size and/or a shape and/or a contour, of antenna(s) 310 included with the second hinge 300B. In some examples, the physical configuration of antenna(s) 310 included with the first hinge 300A is the same as, or mirrors, or is symmetrical with, the physical configuration of antenna(s) 310 included with the second hinge 300B. In some examples, an operational configuration, i.e., a communication protocol, frequency and the like, of antenna(s) 310 included with the first hinge 300A is the same as, or mirrors, an operational configuration of antenna(s) 310 included with the second hinge 300B. In some examples, a shape and/or a size and/or an overall configuration of the antenna(s) 310 can be selected to tune the antenna(s) 310 to desired frequencies. In some examples, an operational configuration of antenna(s) 310 included with the first hinge 300A is different from an operation configuration of antenna (s) 310 included with the second hinge 300B.

As noted above, the hinge including the at least one antenna, in accordance with implementations described herein, allows the at least one antenna to be accommodated within the front frame portion 220 of the frame 290. This allows for installation of a larger antenna 310 and/or additional antennas 310, thus improving communication capabilities of the computing device 200, and enhancing functionality and utility of the computing device 200. This makes additional installation space available in the hollow interior portion of one or both of the arm portions 230 (in which the antenna(s) 310 would otherwise be accommodated). This additional installation space may be used to accommodate additional functional components of the computing device 200 and/or to improve cooling of existing electronic components 250 already received in and/or on one or both of the arm portions 230, thus enhancing functionality and utility of the computing device 200. Accommodating most, or all, of the electronic components 250 of the computing device 200 in the arm portions 230 of the frame 290 may improve a distribution of weight in the computing device 200, thus improving user comfort.

As also noted above, accommodating most, or all, of the electronic components 250 of the computing device 200 in the arm portions 230 of the frame 290 may provide for modularity in the computing device 200. In the example described above, various different arm portions 230, including various different electronic components 250 and/or arrangements of electronic components 250, can be selectively attached to a variety of different front frame portions 220. For example, a front frame portion 220 may be selected by a user, from a plurality of front frame portions 220, based on, for example, a size, a shape, and other configuration and/or aesthetic considerations and/or user preferences. Arm portions 230, including the electronic components 250 that provide functionality to the computing device 200, may then be coupled to the selected front frame portion 220 via connection to the hinges 300, as described above with respect to FIGS. 3A-3F. As noted above, the hinges 300 may be previously coupled in, or embedded in, or otherwise fixed in the shoulder portion(s) 215 of the front frame portion 220, for example, as a result of fabrication. Similarly, the coupling portions 330 of the arm portions 230 may be previously coupled in, or embedded in, or otherwise fixed or provided at the end portions of the arm portions 230 during fabrication. Thus, assembling of a head mounted wearable device can be accomplished by a coupling of the arm portions 230 to the front frame portion 220 via a simple connection (via one, or both, of the pins 350, 352, in the example shown in FIGS. 3A-3F, or another connection device) at the respective coupling portions 340, 330 of the hinge 300 previously provided in the shoulder portion 215 of the front frame portion 220 and arm portions 230. This method of assembly of the arm portions 230 to the front frame portion 220, with the hinge 300 including the at least one antenna 310 having been previously installed in, or embedded in the front frame portion 220, provides for modularity in the configuration and assembly of the computing device 200.

Figure 4:
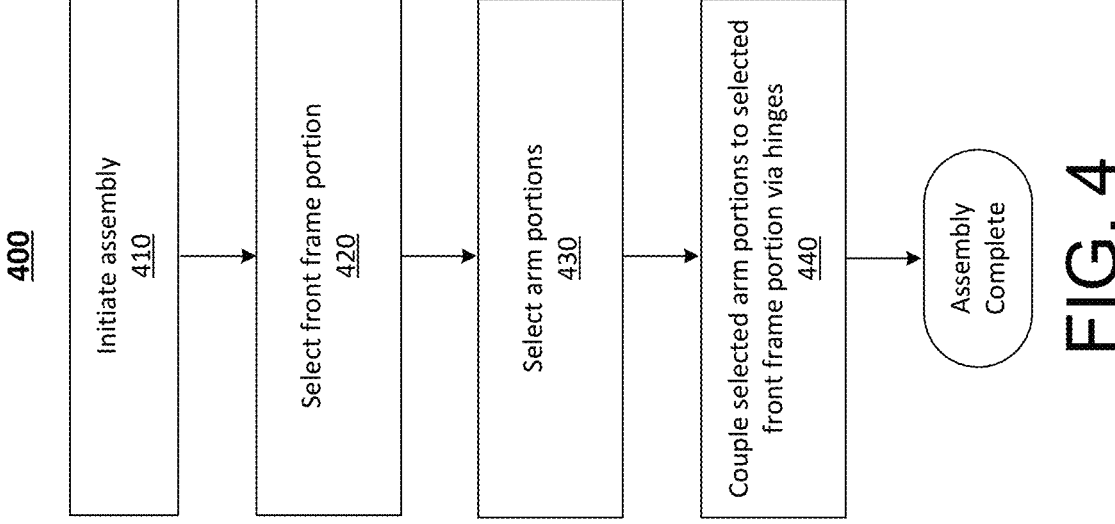
FIG. 4 is a flowchart of an example method.

FIG. 4 is a flowchart of an example method 400, and in particular, a method of modular assembly of a computing device, in the form of a head mounted wearable device. Assembly is initiated (block 410) and a front frame portion of a frame of the head mounted wearable device is selected (block 420). The front frame portion may have been selected from a plurality of different front frame portions available for selection based on, for example, size, aesthetic characteristics, and other such user preferences and/or factors. The selected front frame portion may include a hinge, fixed in the shoulder portion during previous fabrication of the front frame portion. The hinge may include the features of the example hinge described above, including at least one antenna extending into an installation space in the front frame portion, and a coupling portion extending outward from the hinge, to provide for coupling of an arm portion to the hinge. Arm portions for coupling to the selected front frame portion are selected (block 430). The arm portions may be selected based on, for example, desired functionality of the head mounted wearable device, compatibility of components received in the arm portions, compatibility of the arm portions with the selected front frame portion, size, aesthetic characteristics, and other such factors. The selected arm portions are then coupled to the selected front frame portion (block 440) to complete the modular assembly of assembly of the head mounted wearable device.

A number of implementations have been described. Nevertheless, it will be understood that various modifications may be made without departing from the spirit and scope of the specification. Logic flows depicted herein do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A head mounted wearable device, comprising:
a frame, including:
   a front frame portion, the front frame portion including:
      a first hinge coupled in a first shoulder portion of the front frame portion;
      a second hinge coupled in a second shoulder portion of the front frame portion;
      a first antenna extending from the first hinge into the front frame portion of the frame; and
      a second antenna extending from the second hinge into the front frame portion of the frame;
a first arm portion and a second arm portion rotatably coupled to the front frame portion by the first hinge and the second hinge, respectively; and
a plurality of electronic components received in an installation volume defined in at least one of the first arm portion and the second arm portion;
wherein the first hinge includes a first body portion fixed in the first shoulder portion and a first coupling portion that rotatably couples the first arm portion to the front frame portion and the second hinge includes a second body portion fixed in the second shoulder portion and a second coupling portion that rotatably couples the second arm portion to the front frame portion.

2. The head mounted wearable device of claim 1, wherein:
the first antenna extends from the first body portion of the first hinge along an upper orbital portion of the front frame portion; and
the second antenna extends from the second body portion of the second hinge along a lower orbital portion of the front frame portion.

3. The head mounted wearable device of claim 1, wherein the first antenna and the second antenna are electrically isolated from each other and are separately operable.

4. The head mounted wearable device of claim 1, wherein the first antenna is coupled to or integrally formed with the first body portion and extends from the first body portion into an installation volume defined in the front frame portion of the frame.

5. The head mounted wearable device of claim 1, wherein the first antenna is coupled to or integrally formed with the first body portion and is embedded in a material forming the front frame portion of the frame.

6. The head mounted wearable device of claim 1, wherein at least one of the first and second antennas is configured to communicate with an external device.

7. The head mounted wearable device of claim 1, wherein the first antenna is configured to communicate with the second antenna.

8. The head mounted wearable device of claim 1, wherein:

the first antenna extends from the first body portion of the first hinge along a first lower portion of the front frame portion; and the second antenna extends from the second body portion of the second hinge along a second lower portion of the front frame portion;

wherein the head mounted wearable device further includes:

a third antenna extending from the first body portion of the first hinge along a first upper portion of the front frame portion; and a fourth antenna extending from the second body portion of the second hinge along a second upper portion of the front frame portion.

9. The head mounted wearable device of claim 1, wherein the first hinge includes:

at least one fastener configured to rotatably engage the coupling portion of the first arm portion and the first coupling portion of the first hinge.

10. A hinge for a head mounted wearable device, the hinge comprising:

a body portion coupled in a shoulder portion of a front frame portion of a frame of the head mounted wearable device;

a coupling portion extending outward from the body portion and configured to be coupled to a coupling portion of an arm portion of the head mounted wearable device;

at least one fastener configured to rotatably engage the coupling portion of the arm portion and the coupling portion of the hinge;

a first antenna extending from the body portion and into the front frame portion along an upper orbital portion of the front frame portion; and a second antenna extending from the body portion and into the front frame portion along a lower orbital portion of the front frame portion.

11. The hinge of claim 10, wherein the first antenna and the second antenna are electrically isolated from each other and are separately operable.

12. The hinge of claim 10, wherein at least one of the first antenna or the second antenna is configured to communicate with an external device.

13. The hinge of claim 10, wherein at least one of the first antenna or the second antenna is configured to communicate with an antenna of another hinge of the head mounted wearable device.

14. The hinge of claim 10, wherein at least one of the first antenna and the second antenna is coupled to or integrally formed with the body portion, and at least one of the first antenna and the second antenna extends from the body portion of the hinge into an installation volume defined in the front frame portion, or is embedded in a material forming the front frame portion of the frame.

15. A method of assembling a head mounted wearable device, comprising:

selecting a front frame portion, the front frame portion including:

a first hinge coupled in a first shoulder portion of the front frame portion;

a second hinge coupled in a second shoulder portion of the front frame portion;

a first antenna extending from the first hinge into the front frame portion, along a first upper portion or a first lower portion of the front frame portion; and a second antenna extending from the second hinge into the front frame portion, along a second upper portion or a second lower portion of the front frame portion;

and selecting a first arm portion including a first plurality of electronic components;

selecting a second arm portion including a second plurality of electronic components;

coupling the first arm portion to the front frame portion via the first hinge; and coupling the second arm portion to the front frame portion via the second hinge.

16. The method of claim 15, wherein selecting the front frame portion includes selecting the front frame portion from a plurality of front frame portions, the front frame portion having the first hinge, the second hinge, the first antenna, and the second antenna previously incorporated.

17. The method of claim 15, wherein:

the first antenna extends from the first hinge into the front frame portion, along the first lower portion of the front frame portion; and the second antenna extends from the second hinge into the front frame portion, along the second lower portion of the front frame portion;

wherein the front frame portion further includes:

a third antenna extending from the first hinge into the front frame portion, along the first upper portion of the front frame portion; and a fourth antenna extending from the second hinge into the front frame portion, along the second upper portion of the front frame portion.

18. The method of claim 17, wherein at least one of the first, second, third, and fourth antennas is configured to communicate with an external device, and at least one of the first, second, third, and fourth antennas is configured to communicate with another of the first, second, third, and fourth antennas.

\* \* \* \* \*